United States Patent [19]

Mello

[11] 4,250,591
[45] Feb. 17, 1981

[54] SPONGE ROLLERS AND VACUUM MEANS FOR REMOVING WATER FROM VEHICLE IN A CAR WASH

[76] Inventor: Frank A. Mello, 623 S. 23rd Ave., Richmond, Calif. 94804

[21] Appl. No.: 62,292

[22] Filed: Jul. 31, 1979

[51] Int. Cl.³ .............................................. B60S 3/06
[52] U.S. Cl. ................................. 15/306 B; 15/97 B; 15/DIG. 2; 34/243 C
[58] Field of Search ............... 15/97 B, 306 R, 306 A, 15/306 B, 302, DIG. 2; 34/89.1, 243 C

[56] References Cited

U.S. PATENT DOCUMENTS

| | | | |
|---|---|---|---|
| 2,949,678 | 8/1960 | Anderson | 15/302 X |
| 3,453,681 | 7/1969 | Weiderhold | 15/306 R |
| 3,504,394 | 4/1970 | Weigele et al. | 15/97 B X |
| 4,166,302 | 9/1979 | Kim | 15/97 B |

FOREIGN PATENT DOCUMENTS 1493250  7/1967  France ................................. 15/97 B

*Primary Examiner*—Christopher K. Moore
*Attorney, Agent, or Firm*—Alvin E. Hendricson; William R. Piper

[57] ABSTRACT

A car wash in which sponge rollers are used and are yieldingly held against the top and two sides of the vehicle and are positioned in the car wash after the vehicle has been washed. The sponge rollers are compressed against the top and sides of the vehicle and will absorb the water film remaining on the vehicle. A vacuum shoe contacts each sponge roller and vacuum is used for removing any fluid in the sponge roller as the cylindrical surface of the roller moves under the shoe. The fluid withdrawn from the roller is conveyed to the sewer.

2 Claims, 6 Drawing Figures

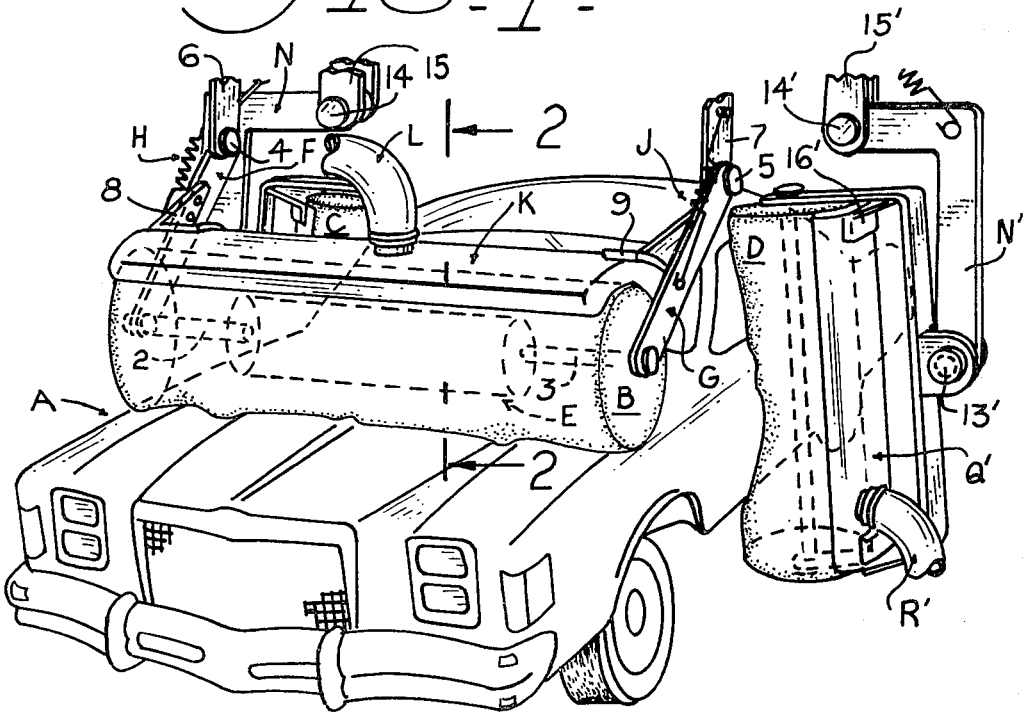
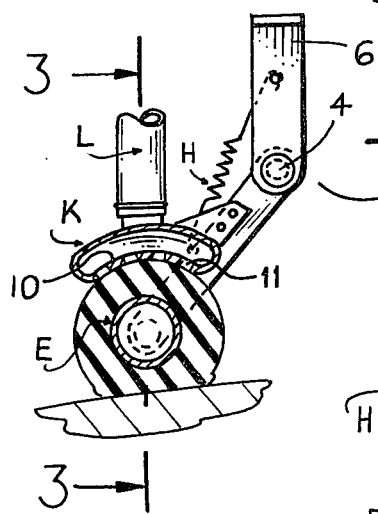
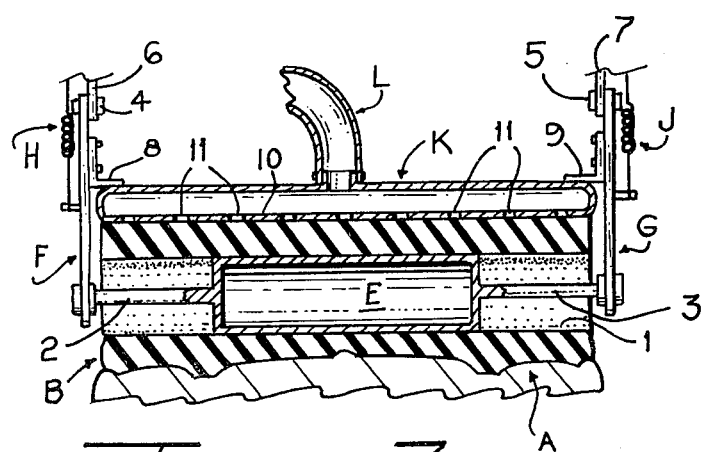

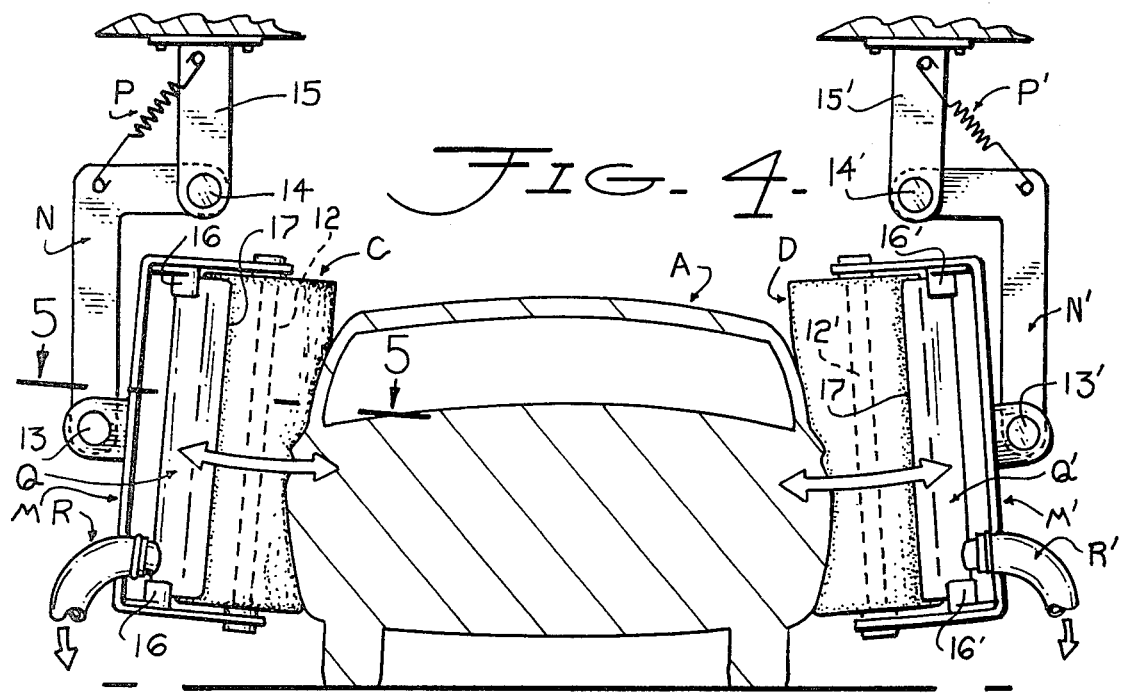
FIG. 4.
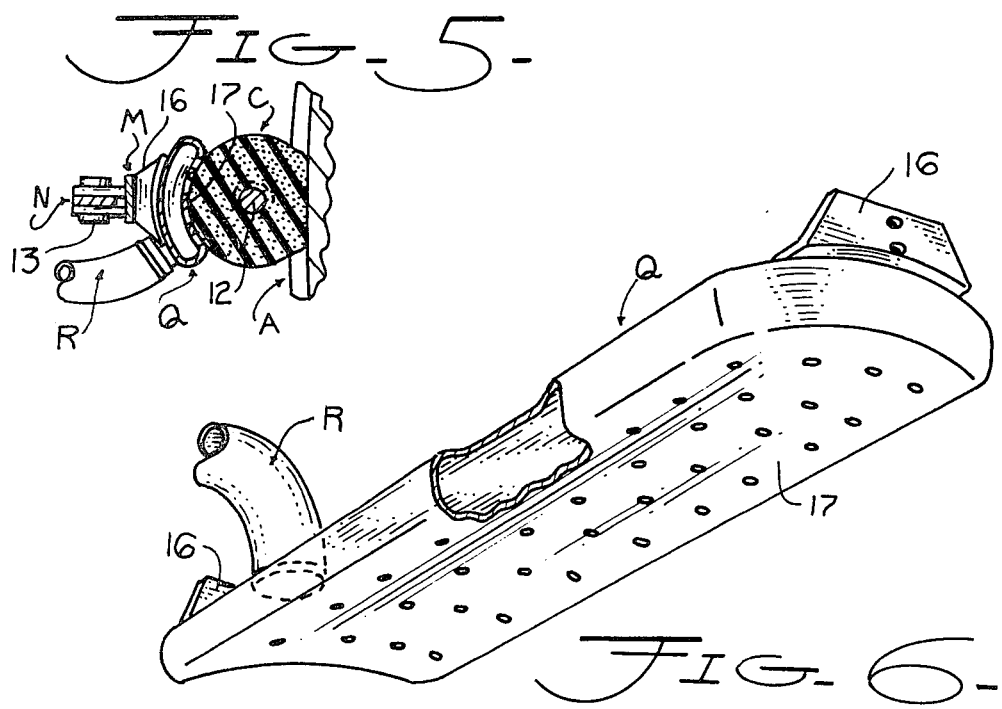
FIG. 5.
FIG. 6.

SPONGE ROLLERS AND VACUUM MEANS FOR REMOVING WATER FROM VEHICLE IN A CAR WASH

SUMMARY OF THE INVENTION

In the standard car wash the vehicle is moved through the washing zone and then air is forced onto the vehicle for removing the film of water remaining thereon. This has not proved to be totally satisfactory because personnel must be used to take cloths and wipe the vehicle dry from its remaining film of water, or else some water spots remain.

An object of my invention is to provide sponge rollers that are yieldingly held against the top and sides of the vehicle as it is moved thereby, these sponge rollers sucking up any water film remaining on the vehicle. The sponge rollers will be rotated by the vehicle as it moves and the water absorbed portions of the rollers will come into contact with vacuum shoes which will remove the water from the sponge and permit the sponge to again contact the vehicle to remove any water therefrom.

BRIEF DESCRIPTION OF THE DRAWINGS

FIG. 1 is a schematic perspective view of a vehicle moving through a standard car wash and show sponge rollers yieldingly held in contact with the top and sides of the vehicle to remove any water film remaining on the vehicle. A vacuum shoe is associated with each sponge roller and the shoe will remove the water from the sponge so that the roller can continue to remove water from the vehicle as it moves by the rollers.

FIG. 2 is a vertical section through the sponge roller that is yieldingly held in contact with the vehicle top and it is taken along the line 2—2 of FIG. 1 and further shows a section through the vacuum manifold that contacts the roller.

FIG. 3 is a longitudinal section on a smaller scale of the top sponge roller and vacuum shoe and is taken along the line 3—3 of FIG. 2. The ends of the top roller have central cavities that permit these portions of the roller to readily yield and permit the passage of a vehicle antenna thereby without damaging the antenna.

FIG. 4 is a front elevational schematic view of the vehicle and illustrates how the two side sponge rollers are yieldingly held against the sides of the vehicle to remove any water therefrom. Each side roller has a vacuum shoe contacting therewith to remove water from the sponge that has been removed from the vehicle.

FIG. 5 is a transverse section through one of the side sponge rollers and its associate vacuum manifold and it is taken along the line 5—5 of FIG. 4.

FIG. 6 is a perspective view of one of the vacuum shoes and illustrates the perforated concave wall that contacts the sponge roller to remove any water absorbed by the roller.

DESCRIPTION OF THE PREFERRED EMBODIMENT

In carrying out my invention I mount the sponge rollers with their vacuum shoes in a standard car wash where the vehicle A is moved through the wash and rinse sections, not shown, nor do I show the means for moving the vehicle. My device includes a top sponge roller B, and two side sponge rollers C and D and I will first describe the top roller B, and its associate parts.

FIGS. 1 and 3, illustrate the top sponge roller B, as having a hollow cylindrical interior 1 and a hollow supporting drum E, is centered in the roller. The drum has axially aligned shaft portions 2 and 3 and these extend outwardly from the ends of the drum as clearly illustrated in FIG. 3, so as to project beyond the ends of the sponge roller. Arms F and G, are pivotally connected to the outer ends of the aligned stub shafts 2 and 3, respectively. The other ends of the arms F and G, are pivotally connected at 4 and 5 to support members 6 and 7, respectively. Adjustable coil springs H and J, interconnect the arms F and G to their respective supports 6 and 7.

The length of the sponge roller B, is substantially equal to the width of the vehicle A. Normally the weight of the roller B, drum C and arms F and G, is sufficient to compress the portion of the sponge rubber that contacts the vehicle A and the sponge will suck up any water film remaining on the vehicle which it contacts. FIG. 1 shows the sponge roller A contacting and conforming to the irregular surface of the vehicle hood as the vehicle is moved under the roller. The arms F and G will permit the roller B to move over the top of the vehicle from the hood to the rear end thereof and to remove any liquid film from the vehicle contacted by the roller as the vehicle is moved along the car wash runway. The springs H and J, are used to lessen the weight of the sponge roller B on the vehicle.

FIGS. 1, 2 and 3 further show a vacuum shoe K that overlies the sponge roller B, and has a length coextensive with the roller length. Brackets 8 and 9 secure the vacuum shoe to the arms F and G, respectively. FIG. 2 shows the vacuum shoe K, as being hollow and provided with a concave bottom wall 10 that has a transverse curvature conforming to the outer diameter of the sponge roller B. The concave bottom wall 10 has perforations 11 and a vacuum hose L communicates with the interior of the shoe K so that any liquid soaked portion of the sponge roller B will have its liquid removed from the sponge, the liquid passing through the openings 11 and being withdrawn from the shoe interior by the vacuum created in the hose L by a vacuum means, not shown, such as a suction pump.

The two side sponge rollers C and D are identical in their structure and manner of support and therefore a detailed description will be given of the roller C and its support and like parts for the sponge roller D will be given the same reference characters but these will be primed. In FIG. 4 the side sponge roller C has its shaft 12 with its ends journalled in a U-shaped frame M. This frame is pivotally supported at 13 to an L-shaped arm N, and the free end of the arm is pivoted at 14 to a supporting member 15. The weight of the sponge roller C and its supporting apparatus when hanging from the L-shaped N will have a tendency to swing the roller into contact with the side of the vehicle A where the sponge rubber surface contacting the vehicle will conform to the irregular vehicle surface and will remove the liquid film therefrom. An adjustable spring P has its ends connected to the L-shaped arm N, and to the support 15 so as to control the force of the sponge roller C against the vehicle side.

In FIGS. 4, 5 and 6, I show another vacuum shoe Q that is similar to the vacuum shoe K, and has a length coextensive with the length of the sponge roller C. Brackets 16 connect the ends of the vacuum shoe Q to the arms of the U-shaped frame M, in such a manner that the perforated concave wall 17 of the shoe will contact the adjacent surface of the sponge roller C. A vacuum hose R communicates with the interior of the vacuum shoe Q and will remove any liquid from the sponge roller C as the saturated portion of the roller contacts the concave perforated wall of the vacuum shoe Q.

From the foregoing description of the various parts of the device, the operation thereof may be readily understood. Referring to FIG. 1, the vehicle is being pulled through a car wash where it has been washed and rinsed. The horizontal sponge roller B is free to be swung upwardly where the roller will extend across the width of the vehicle and the portion of the roller actually contacting the vehicle will conform to the uneven contour and pick up any liquid on the vehicle. As the vehicle is moved, the sponge roller will rotate and the saturated portion of the sponge from the liquid it has absorbed will pass under the vacuum shoe K where this liquid will be sucked from the sponge roller and pass through the openings 11 in the perforated plate 10. This liquid is then removed from vacuum shoe K and will be conveyed to the sewer, not shown, through the vacuum tube L.

Some vehicles may have radio antenna rods projecting upwardly from the vehicle hood or other parts of the vehicle. It will be noted from FIG. 3, that the drum E, is shorter in length than the sponge roller B, and the drum is centered in the roller so that each end of the roller will project a considerable distance beyond the adjacent end of the roller. The cylindrical hollow interior 1 of the roller B that extends beyond the ends of the drum E will provide space so that if either end of the roller is contacted by the vehicle antenna, the roller portion thus contacted can collapse inwardly to permit the antenna to ride under the roller without being damaged.

I have already mentioned how the side sponge rollers C and D, are yieldingly held against the sides of the vehicle as it is moved past these rollers. The liquid film on the sides of the vehicle will therefore be removed by the rollers C and D, and the vacuum shoes Q and Q' will remove the water from the rollers and this water will be conveyed to the sewer by the vacuum hoses R and R'. The result is that all of the liquid film on the top and sides of the vehicle will be removed.

I claim:

1. Vacuum means for removing a film of water from a vehicle after the vehicle has been washed in a car wash; comprising
   (a) a sponge roller rotatable about a horizontal axis;
   (b) means for yieldingly supporting the roller and causing it to yieldingly contact the vehicle top as the vehicle moves thereunder, the sponge roller rolling over the vehicle top for removing the film of water remaining on the vehicle;
   (c) a stationary vacuum shoe contacting the surface of the sponge roller and mounted on the means yieldingly supporting said roller; and
   (d) means for creating a vacuum in said shoe for sucking up the water from said rotating roller and for discharging the water.

2. The combination as set forth in claim 1 further including
   (a) a sponge roller positioned on each side of the vehicle for rotation about substantially vertical axes;
   (b) means for yieldingly supporting each side roller and for yieldingly holding said side rollers against the vehicle sides as the vehicle moves thereby, the two side sponge rollers removing the water film remaining on the sides of the vehicle;
   (c) a stationary vacuum shoe contacting each side roller; and
   (d) means for creating a vacuum in each vacuum shoe contacting a side roller for sucking up the water therefrom and for conveying it away from the vehicle.

* * * * *